(12) United States Patent
Miura (10) Patent No.: US 9,034,241 B2
(45) Date of Patent: May 19, 2015

(54) HANDLE FOR CONTAINER, HANDLE-EQUIPPED CONTAINER, AND METHOD FOR MANUFACTURING HANDLE AND CONTAINER

(75) Inventor: Masaki Miura, Yokohama (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 426 days.

(21) Appl. No.: 13/566,848

(22) Filed: Aug. 3, 2012

(65) Prior Publication Data

US 2012/0292830 A1    Nov. 22, 2012

Related U.S. Application Data

(62) Division of application No. 11/916,142, filed as application No. PCT/JP2006/311137 on May 26, 2006, now Pat. No. 8,261,932.

(30) Foreign Application Priority Data

May 30, 2005 (JP) ................................. 2005-156768

(51) Int. Cl.
*B29C 49/20* (2006.01)
*B65D 23/10* (2006.01)
*B29K 67/00* (2006.01)
(Continued)

(52) U.S. Cl.
CPC .............. *B65D 23/106* (2013.01); *B29C 49/20* (2013.01); *B29C 2049/2039* (2013.01); *B29K 2067/00* (2013.01); *B29K 2667/00* (2013.01); *B29L 2031/7158* (2013.01)

(58) Field of Classification Search
CPC .................... B65D 23/106; B29C 2049/2039; B29C 2049/065; B29C 37/005; B29C 2033/023; B29C 4/209
USPC .......... 220/770, 771; 264/248, 250, 523, 524; 215/398
See application file for complete search history.

(56) References Cited

U.S. PATENT DOCUMENTS 5,092,476 A    3/1992    Yasuda et al.
5,167,970 A   12/1992    Yoshino et al.
(Continued)

FOREIGN PATENT DOCUMENTS

JP    6134798 A    5/1994
JP    6263150 A    9/1994
(Continued)

OTHER PUBLICATIONS

Itokawa et al. (JP 2004122736) JAP to ENG machine translation of Description, done on Nov. 20, 2014.*
(Continued)

*Primary Examiner* — Joseph S Del Sole
*Assistant Examiner* — Lawrence D Hohenbrink, Jr.
(74) *Attorney, Agent, or Firm* — Westerman, Hattori, Daniels & Adrian, LLP (57) ABSTRACT

The present invention provides a handle for a container, a handle-equipped container, and a method for manufacturing same. It is accordingly possible to provide a container that has a cross-sectional shape that is substantially quadrangular and allows for exceptional storability, has favorable blow-molding properties, presents none of a variety of anomalies in the container and the handle, and has adequate strength to withstand drop impact.

4 Claims, 8 Drawing Sheets

(51) Int. Cl.
　　　*B29K 667/00*　　　(2006.01)
　　　*B29L 31/00*　　　(2006.01)

(56) References Cited

U.S. PATENT DOCUMENTS

| | | | |
|---|---|---|---|
| 5,535,901 A | | 7/1996 | Ishii et al. |
| 5,653,020 A | * | 8/1997 | Romano' et al. ............... 29/856 |
| 6,012,597 A | | 1/2000 | Nishihara et al. |
| 6,460,715 B1 | | 10/2002 | Yonemori et al. |

FOREIGN PATENT DOCUMENTS

| | | | |
|---|---|---|---|
| JP | 7088939 A | | 4/1995 |
| JP | 08290460 A | * | 11/1996 |
| JP | 8290460 A | | 11/1996 |
| JP | 2000255580 A | | 9/2000 |
| JP | 2004122736 A | * | 4/2004 |
| WO | 9928200 A1 | | 6/1999 |
| WO | WO 2005047197 A1 | * | 5/2005 |

OTHER PUBLICATIONS

Okamoto (JP H08290460) JAP to ENG machine translation of Description, done on Nov. 20, 2014.*
International Search Report of PCT/JP2006/311137, date of mailing Sep. 5, 2006.

* cited by examiner

Background Art

HANDLE FOR CONTAINER, HANDLE-EQUIPPED CONTAINER, AND METHOD FOR MANUFACTURING HANDLE AND CONTAINER

CROSS-REFERENCE TO RELATED APPLICATION

This is a Divisional Application of U.S. patent application Ser. No. 11/916,142, filed on Jun. 22, 2009, which is a National Stage Application of PCT/JP2006/311137, filed May 26, 2006, which claims the benefit of priority under 35 U.S.C. §119(a) of Patent Application No. 2005-156768 filed in Japan on May 30, 2005, the entire contents of which are hereby incorporated by reference.

TECHNICAL FIELD

The present invention relates to a handle-equipped container that can be filled with tea or other liquids, and in particular to a heat-resistant handle-equipped container that can be filled with a high-temperature liquid without deforming the container, and a method for manufacturing the container. The invention more particularly relates to a handle-equipped container and method for manufacturing same, wherein a transverse cross-sectional shape of a body part is made substantially quadrangular, and a space is provided between a handle and a wall surface that surrounds a convexity for attaching the handle in a concavity, whereby the blow-molding properties are improved, which creates no incidence of separation between the container and the handle, wrinkling, cracking, irregular thickness caused by deformation or inappropriate stretching, or other anomalies.

The present invention further relates to a handle for a container that can be ideally used on the above mentioned container.

BACKGROUND ART

Large-size plastic containers that have a capacity of 1.5 L, 2.0 L, or more, and are used to store tea, alcoholic drinks, and other beverages; condiments; or the like are often fitted with a handle to improve ease of use. For reasons related to performance and cost, such handle-equipped containers are often made from polyethylene terephthalate or another polyester, and the handle material is often made from polypropylene.

The following are examples of handle-equipped plastic containers that are known in the art.

Prior Art Document 1: Japanese Laid-open Patent Application No. 2000-255580

Prior Art Document 2: Japanese Laid-open Patent Application No. 2000-43877

Figure 9:
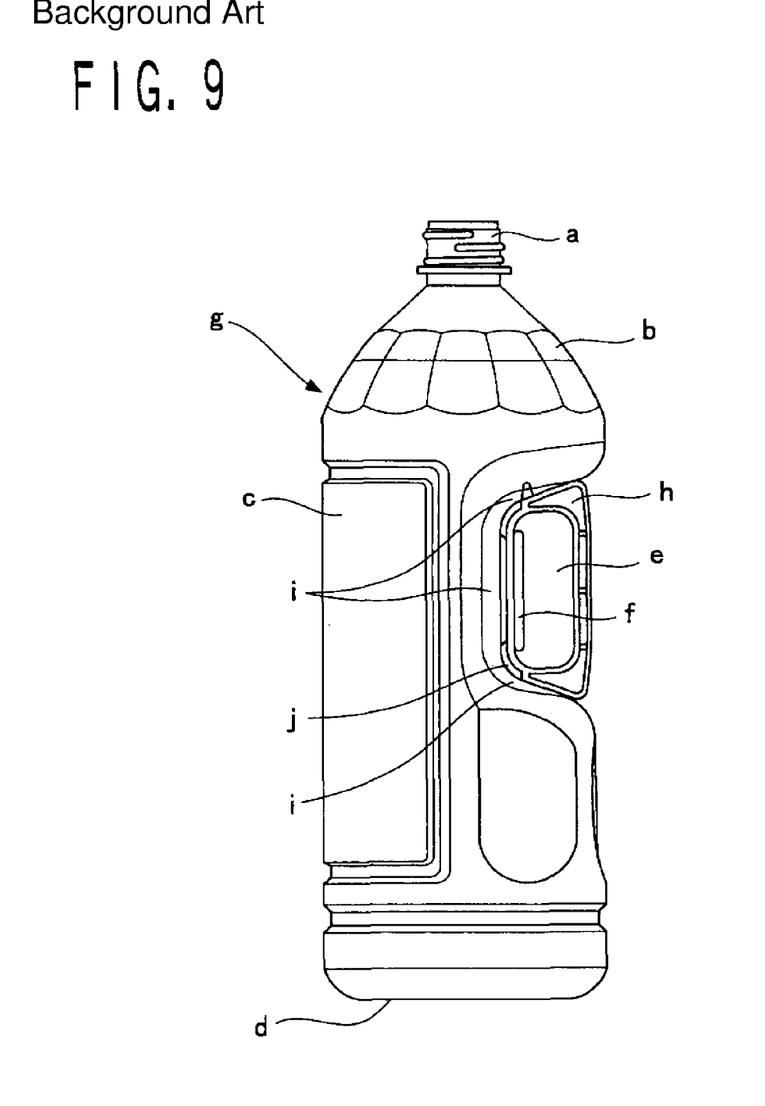
FIG. 9 is a side view that shows an example of a conventional handle-equipped container.
Figure 10:
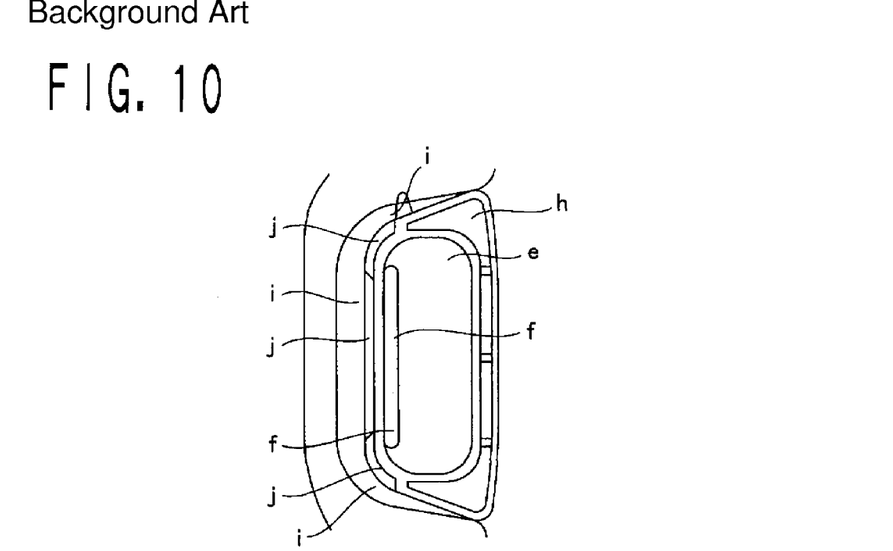
FIG. 10 is a side view of a conventional handle-equipped container, wherein an element of the handle has been enlarged.

In Prior Art Document 1, the handle is made from the same polyester as the container to aid recyclability. As shown in FIGS. 9 and 10, the container of Prior Art Document 1 comprises a polyester container g, which has a finish part a, a shoulder part b, a body part c, and a base part d in the stated order from the top part; which has a concavity e provided to a portion of the body part c; and which has a handle-attaching convexity f provided to the concavity e; and a polyester handle h, which is attached to the handle-attaching convexity f of the container g. A space j is provided between the handle h and a wall surface i that surrounds the convexity f on the concavity e. As a result, less frictional resistance occurs in the portion provided with the space j between the wall surface i that surrounds the convexity f and the handle h; blow-molding ability improves; no incidence is presented in regard to scratches, melting, or whitening of the concavity e, nor of thickness defects in the concavity e or the base part d; and a satisfactory handle-equipped container can be obtained.

Figure 11:
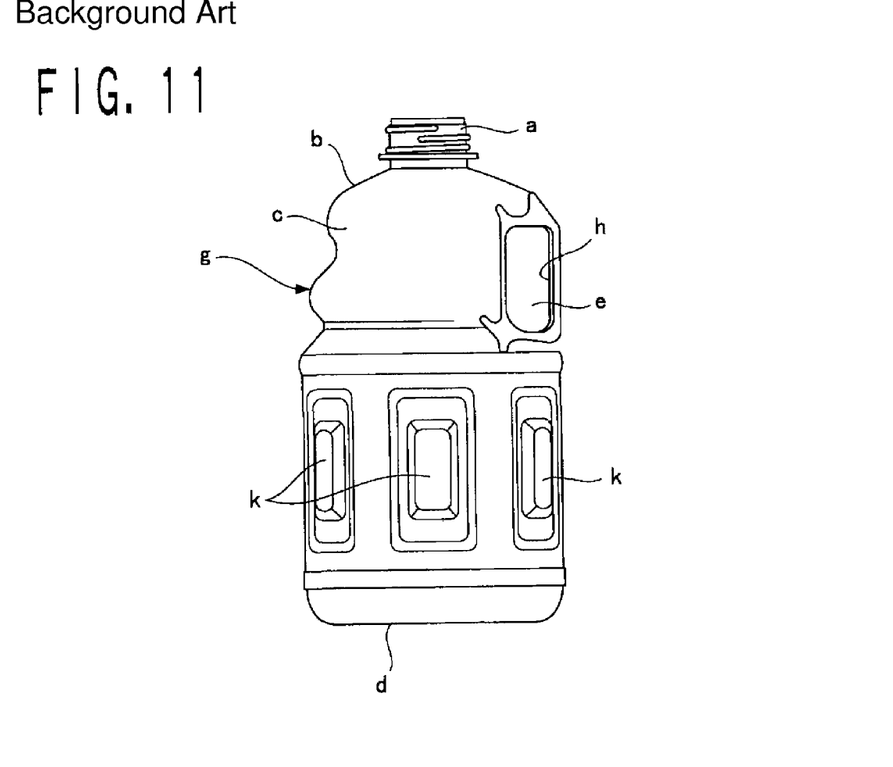
FIG. 11 is a side view that shows an example of a conventional heat-resistant handle-equipped container.

The heat-resistant handle-equipped container according to Prior Art Document 2 is obtained as described below. As shown in FIG. 11, the separate handle h is insert-molded on the body part c of the top part of the container g, and the transverse cross section of the body part c of the top part to which the handle h is attached is molded into a round shape. The transverse cross section of the body part c of the base part, to which a reduced-pressure absorption panel k is attached, is molded into a quadrangular shape, a side wall of the body part c that enfolds an undercut part of the handle h is heat set, and the ratio between the area of the reduced-pressure absorption panel k and the area of the surface below the neck ring of the finish part a is 0.22 or greater. A satisfactory handle-equipped heat-resistant container is thereby obtained.

A large demand has arisen over the past several years for plastic containers having a quadrangularly shaped transverse cross section in order to increase the volumetric efficiency during storage and transport.

The handle-equipped container of Prior Art Document 1 is described as having an effect whereby blow-molding properties are improved, and anomalies arising in the concavity e and base part d are eliminated. However, in the examples, mention is only made of the body part having a round cross-sectional shape, and no mention is made in regard to an object of obtaining an angular handle-equipped container, nor to resolving means. Moreover, no mention is made in regard to the imparting of a heat-resisting property that enables high-temperature filling to be performed.

The body part of the heat-resistant handle-equipped container of Prior Art Document 2 has a quadrangular cross section below the position where the handle is attached; however, the upper part where the handle is attached has a round cross-section, which is inadequate for improving volumetric efficiency. Favorable heat resistance can be obtained by heat-setting the body part that enfolds an undercut part of the handle. However, the heat-setting is performed on the container wall, which contacts the molding mold, and the portion that enfolds the handle undercut part is positioned within the container. Therefore, heat setting cannot be directly performed, and a concern arises in that the strength with which the handle is attached will decline as a result of contraction and deformation during high temperature filling.

DISCLOSURE OF THE INVENTION

It is therefore an object of present invention to provide a heat-resistant handle-equipped container (and a method for manufacturing same) that has exceptional storability enabled by having a cross-sectionally quadrangular shape; favorable blow-molding properties; and minimal incidence of separation between the container and the handle, wrinkling, cracking, deformation, thickness irregularities caused by unsuitable stretching, or other anomalies. The container also has sufficient strength against drop impact.

The present invention has been proposed in order to achieve the aforesaid object, and is characterized in comprising the following structure.

Specifically, according to [a first aspect of] (*1) the present invention there is provided a handle-equipped container, which comprises a polyester container that has a finish part, a shoulder part, a body part, and a base part in the stated order from a top part; and that has a concavity provided to a portion of the body part; and a separate handle attached to the concavity. The handle-equipped container is characterized in that a transverse cross-sectional shape of the body part is substantially quadrangular; the concavity is in a corner part of an upper half part of the body part; and the handle is attached to the concavity along a diagonal line of the body part.

According to [a second aspect of] the present invention there is provided the handle-equipped container [of the first aspect], wherein a handle-attaching convexity is provided to the concavity; and a space is provided between the handle and a wall surface that surrounds the handle-attaching convexity.

According to [a third aspect of] the present invention there is provided the handle-equipped container [of the second aspect], wherein the handle-equipped container is a heat-resistant handle-equipped container; and the wall surface that surrounds the convexity for attaching the handle is heat-set.

According to [a fourth aspect of] the present invention there is provided the handle-equipped container [of the first through third aspects], wherein an end surface of the handle-attaching convexity is formed in the shape of a panel.

According to [a fifth aspect of] the present invention there is provided the handle-equipped container [of the first through fourth aspects], wherein a longitudinal rib is formed on a corner part of body part connected to a bottom part of the handle attached to the container.

According to [a sixth aspect of] the present invention there is provided the handle-equipped container [of the first through fifth aspects], which is formed so that a distance between opposing corner parts on the bottom half of the body part below the handle attachment position gradually decreases towards the base part.

According to [a seventh aspect of] the present invention there is provided a handle for a container, characterized in comprising a holding part and an attachment part that is attached to a handle-attaching convexity. The holding part has a transverse cross section in the shape of an "H," and an interior plate of the holding part is narrower than an exterior plate.

According to [an eighth aspect of] the present invention there is provided the handle for a container [of the seventh aspect], wherein the material of the handle is a material recycled from articles molded from polyethylene terephthalate.

According to [a ninth aspect of] the present invention there is provided a method for manufacturing a heat-resistant handle-equipped container, comprising insert-molding a separate polyester handle onto a top part of a body part of a hollow container when the container is formed by blow-molding a polyester preform. The method for manufacturing a heat-resistant handle-equipped container is characterized in comprising the steps of blow-molding with a blow-molding mold positioned so that a central axis of the body part below a handle-attaching convexity provided to a concavity on a top half of the body part is inclined 1°±0.5° toward the handle-attaching convexity; and heat-setting a wall surface that surrounds the handle-attaching convexity in the concavity.

According to [a tenth aspect of] the present invention there is provided the method for manufacturing a heat-resistant handle-equipped container [of the ninth aspect], wherein a surface treatment is performed on at least some of the blow-molding mold in a region for molding the concavity of the container and the handle-attaching convexity.

According to [an eleventh aspect of] the present invention there is provided the method for manufacturing a heat-resistant handle-equipped container [of the ninth and tenth aspects], wherein an insulation treatment is performed on a region of the blow-molding mold that can contact the handle during the insert-molding.

Description of the Reference Letters and Numbers

The reference letters in the drawings are as follows.
1: Handle-equipped container (heat resistant handle-equipped container)
2, a: Finish part
3, b: Shoulder part
4, c: Body part
5, d: Base part
6, e: Concavity
7, f: Handle-attaching convexity
8, g: Container
9, h: Handle
10, i: Wall
11, j: Gap
12: Top half part
13: Corner part
14: Longitudinal rib
20: Screw
21: Flange
22: Side wall
30: Horizontal groove
31: Bottom half part
32: Side wall
33: Panel shape end surface
40: Holding part
41: Attachment part
42: Exterior plate
43: Interior plate
44: Ring
45: Protrusion
46: Reinforcement rib
J: Central axis
k: Decompression absorption panel
L: Diagonal line Effect of the Invention The handle-equipped container of the present invention has exceptional storability because the transverse cross-section of the body part is substantially quadrangular in shape. The parting line of a blow-molding mold can be oriented in the direction of the diagonal line of the transverse cross-sectional shape in order to attach the handle along the diagonal line, and designs on the various surfaces can be produced without restriction. If the handle-attaching convexity is provided to the concavity, and the handle is attached with a gap being provided between the handle and the wall that surrounds the convexity for attaching the handle, then blow-molding properties will be improved by the gap between the handle and the wall in the concavity that surrounds the convexity for attaching the handle. As a result, the container and the handle will undergo no incidence of separation, wrinkling, cracking, deformation, thickness irregularities caused by unsuitable stretching, or other anomalies. Additionally, uniform thickness due to suitable stretching will result; i.e., the thickness will correspond to the need for strength. Sufficient strength will be obtained, even against drop impact. If the container and handle are both made of polyester, an exceptional effect is obtained in regard to recyclability.

If the distance between opposite corner parts is gradually made to narrow towards the base part in the bottom half part of the container below the position where the handle is attached, the thickness distribution in the vicinity of the base part can be improved.

If regions of the blow-molding mold that can contact the handle are treated so as to be heat-insulated during insert molding, it will be possible to prevent the handle from adhering to the mold, or to prevent any occurrence of deformation, whitening, heat degradation, or the like.

Making the cross-sectional shape of the holding part of the handle into the shape of an "H" allows the weight of the handle to be reduced. Making the plate inside the holding part narrower than the exterior plate has the effect of reducing the likelihood of the fingers, when gripping the holding part, coming into contact with the interior plate, and facilitates holding the handle.

The longitudinal compression strength of the container can be improved by providing a longitudinal rib on a corner part of body part that connects to the bottom of the handle that is attached to the container.

When the handle-equipped container of the present invention is configured as a heat-resistant container, the handle will not come loose even when the contents are filled at a high temperature, and a container having good heat resistance can be obtained because the wall that surrounds the handle-attaching convexity will be heat set.

The container is blow-molded in advance so the central axis of the body part below the handle-attaching convexity will be inclined by 1°±0.5° toward the side of the handle-attaching convexity. The surface of the heat resistant handle-equipped container to which the handle is attached does not contract, and is accordingly readily inclined. However, molding the container in a state wherein the axis is inclined in advance in the reverse direction has the effect of yielding overall balance, correcting the inclination of the container, and producing a normal state. The wall surface that surrounds the handle-attaching convexity is heat set; therefore, wrinkles tend not to form, and the handle is prevented from coming loose or readily detaching.

In the method for manufacturing the container of the present invention, a surface treatment is performed on at least some of the blow-molding mold in regions for molding the handle-attaching convexity, the concavity of the container, and the handle-attaching convexity (*2). As a result, polyester material flows more readily in the surface treated regions and, conversely, less readily below the handle-attaching convexity. Therefore, an effect is obtained whereby the polyester material gathers and thickens, and increased strength is obtained below the handle-attaching convexity, where the load will be the greatest.

BEST MODE FOR CARRYING OUT THE INVENTION

The best mode for carrying out the present invention shall be described below with reference to the drawings.

Embodiment 1

Figure 1:
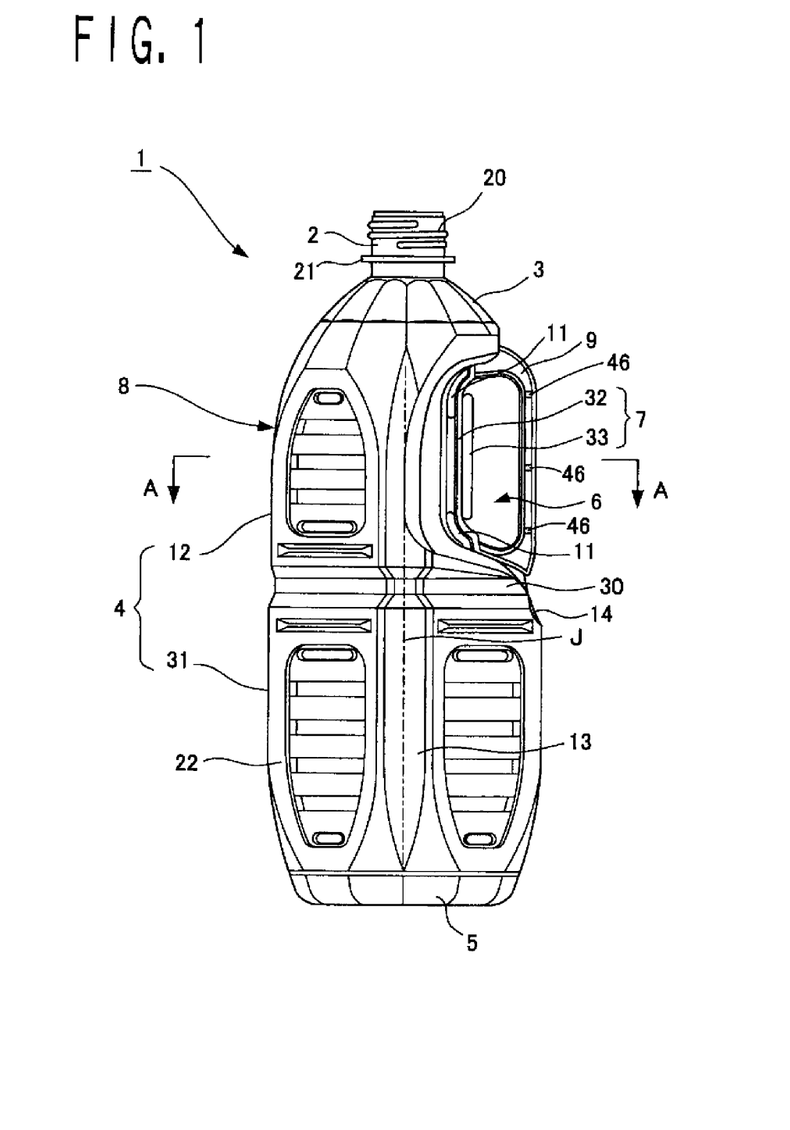
FIG. 1 is a side view of a handle-equipped container (heat-resistant handle-equipped container) that shows a preferred embodiment of the present invention.
Figure 2:
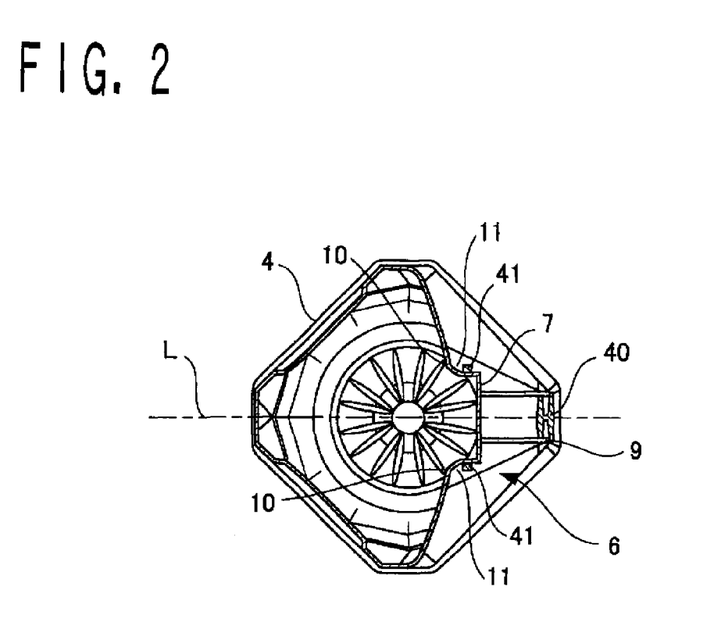
FIG. 2 is a cross-sectional view across line A-A in FIG. 1.
Figure 3:
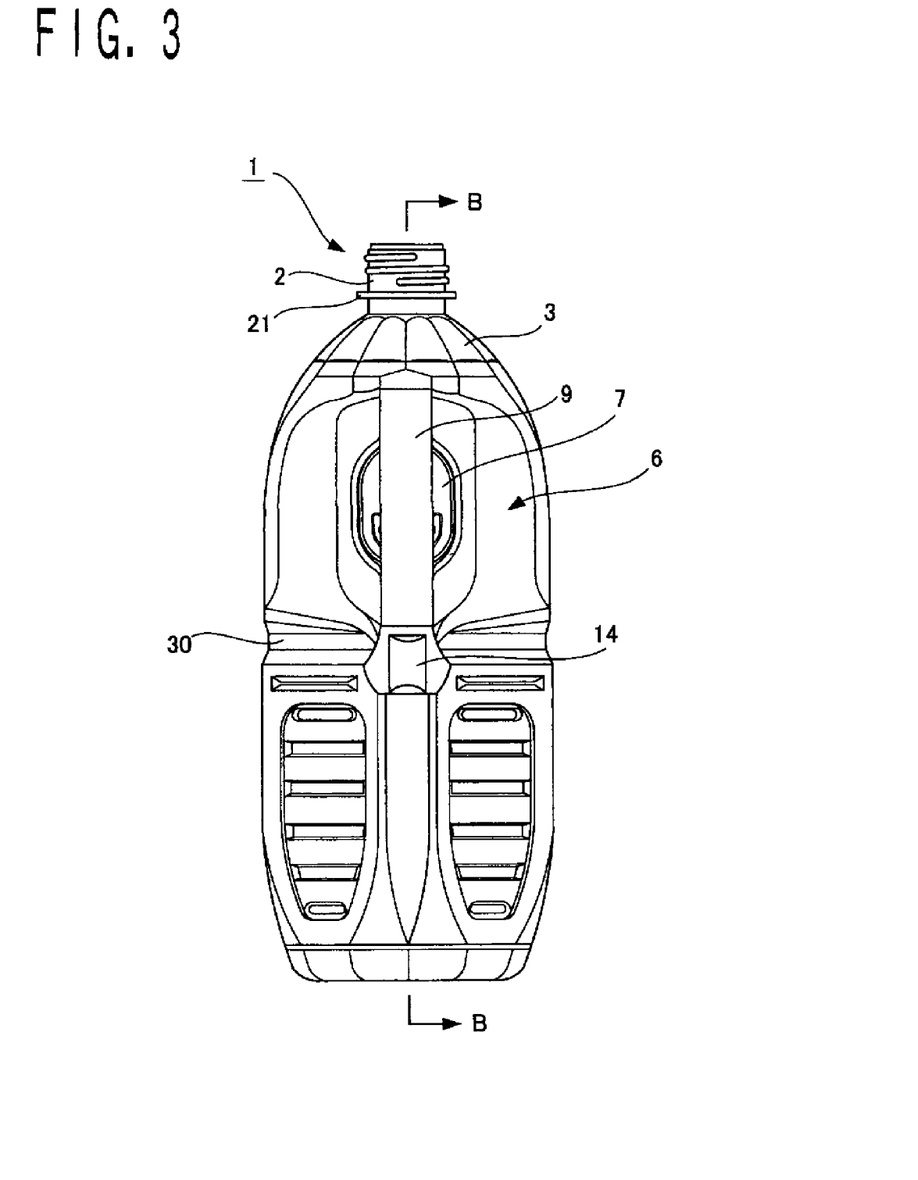
FIG. 3 is a front view of the handle-equipped container (heat-resistant handle-equipped container) of the present invention.
Figure 4:
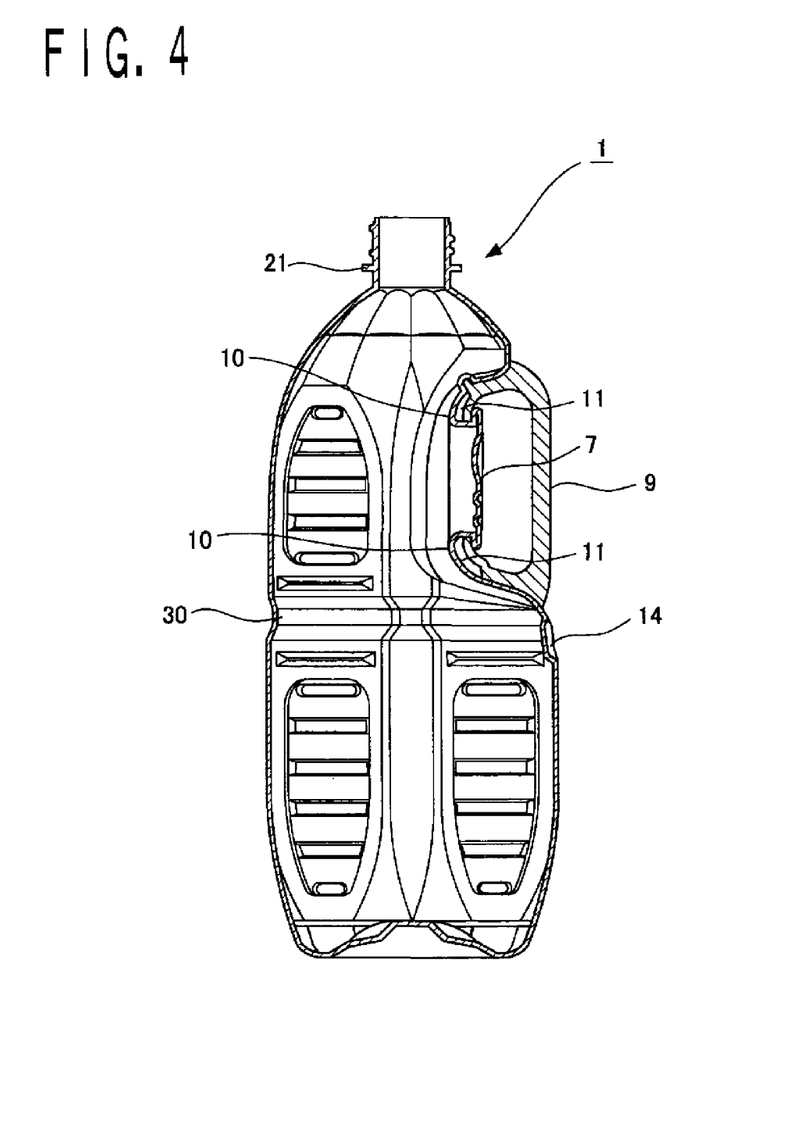
FIG. 4 is a cross-sectional view across line B-B in FIG. 3.
Figure 5:
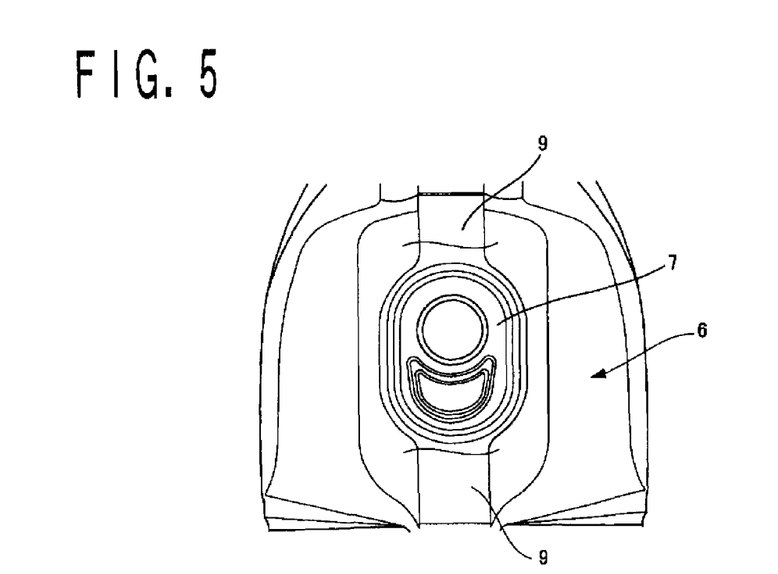
FIG. 5 is an enlarged view showing an end view of a panel-shaped end surface of the present invention, wherein a portion of the handle has been omitted.
Figure 6:
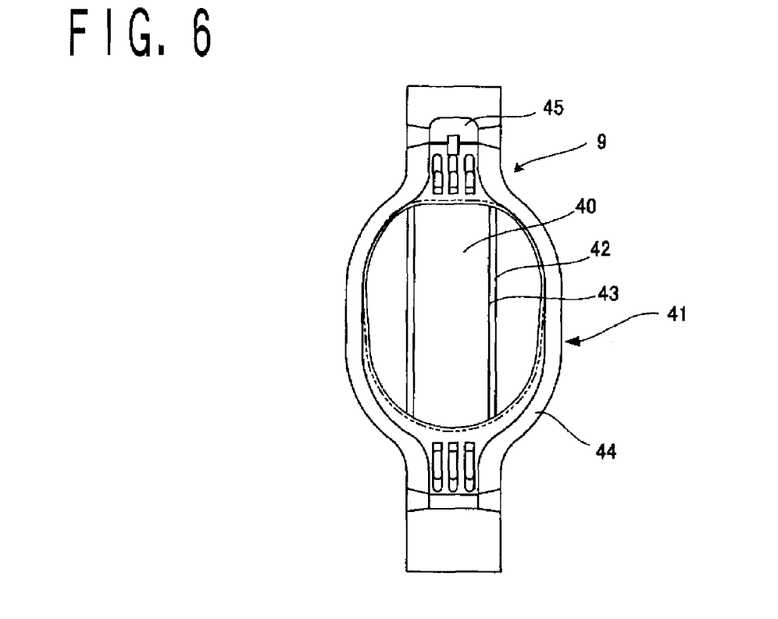
FIG. 6 is a rear view of the handle of the present invention.
Figure 7:
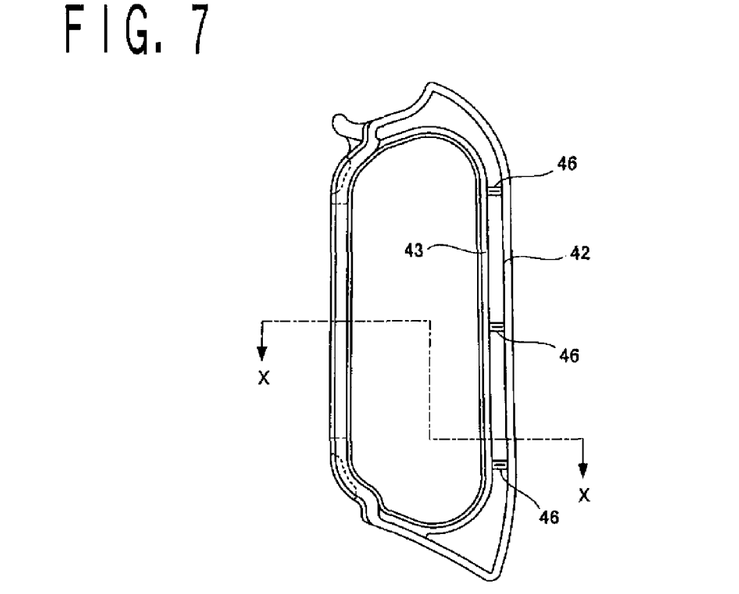
FIG. 7 is a side view of the handle of the present invention.
Figure 8:
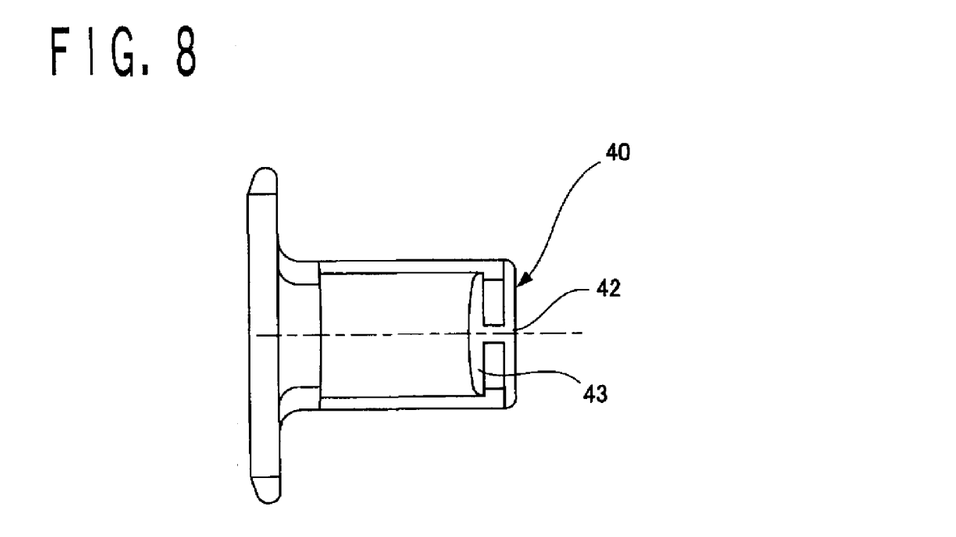
FIG. 8 is a cross-sectional view across line X-X line in FIG. 7.

FIG. 1 is a side view of a handle-equipped container (heat-resistant handle-equipped container) that shows an embodiment of the present invention. FIG. 2 is a cross-sectional view across line A-A in FIG. 1. FIG. 3 is a front view of the handle-equipped container. FIG. 4 is a cross-sectional view across line B-B in FIG. 3. FIG. 5 is an enlarged drawing that shows a panel shape of an end surface of a handle-attaching convexity. FIG. 6 is a rear view of the handle. FIG. 7 is a side view of the handle. FIG. 8 is a cross-sectional view across line X-X in FIG. 7.

In the drawings, a handle-equipped container 1 comprises a polyester container 8 and a polyester handle 9. The polyester container 8 has a finish part 2, a shoulder part 3, a body part 4, and a base part 5 in the stated order from the top part. A concavity 6 is provided to a portion of the body part 4. A handle-attaching convexity 7 is provided to the concavity 6. The polyester handle 9 is attached to the handle-attaching convexity 7 of the container 8. A space 11 is provided between the handle 9 and a wall surface 10 that surrounds the handle-attaching convexity 7 in the concavity 6. A transverse cross-section of the body part 4 is in a substantially square shape, the concavity 6 is in a corner part 13 of the top half part 12 of the body part 4, and the handle-attaching convexity 7 is positioned in the concavity 6 along a diagonal line L of the top half part 12.

The finish part 2 of the container 8 has a thread 20 onto which a cap is screwed, and a flange 21 therebelow. The finish part 2 extends past the shoulder part 3 to the body part 4. The body part 4 comprises a side wall 22. The bottom part of the side wall 22 extends to the base part 5.

As stated above, the body part 4 has a transverse cross-section that is substantially square-shaped, and is divided into the top half part 12 and a bottom half part 31 by a horizontal groove 30 disposed in an intermediate position therealong. The concavity 6 to which the handle 9 is attached is provided to the corner part 13 of the top half part 12. The concavity 6 is formed so that when the handle 9 is attached thereto, the handle will not protrude from the outside diameter of the body part 4, and the container can be stored efficiently with the handle tightly attached thereto. The handle-attaching convexity 7 is provided to the concavity 6, but is positioned in the concavity 6 on a diagonal line L of the top half part 12, and comprises a side wall 32 and a panel-shaped end surface 33. The side wall 32 is formed adequately high, and a space 11 is obtained between the handle 9 and the wall surface 10 that surrounds the handle-attaching convexity 7.

The structure of the space 11 enables the wall surface 10 that surrounds the handle-attaching convexity 7 to be heat set. This is achieved by having the mold enter between the handle 9 and the wall surface 10 that surrounds the handle-attaching convexity 7 when the container is to be molded, and increasing the temperature of the mold. This is an important configuration of the present invention. The panel-shaped end surface 33 is formed in a flange shape, and cannot be removed when the handle 9 is attached to the handle-attaching convexity 7.

Molding the panel-shaped end surface 33 in the shape of a panel increases the amount of processing, improves the thickness distribution, minimizes the occurrence of wrinkling during high-temperature filling, and makes it possible to greatly reduce the incidence of contraction-related anomalies in the container 8 and the handle 9.

A problem is presented in containers having a concavity 6 insofar as the movement of the resin worsens at the circumference thereof during blow-molding, and the resulting effect tends to reduce the uniformity of the thickness distribution at the circumference of the base part, which is where maximum stretching occurs. However, when the distance between opposite corner parts of the bottom half part 31 gradually becomes smaller towards the base part, the thickness distribution in the vicinity of the base part can be improved. It is preferable that the distance between opposite corner parts gradually decreases so that the length in the corresponding direction at the ground surface will be 55 and 75% as great. It is also preferable for the distance to gradually decrease so that the width at the ground surface in the direction along the diagonal lines will be substantially the same.

A longitudinal rib 14 is formed on the corner part of body part that connects to the bottom part of the handle (the corner part that corresponds to the handle attachment position at the upper end of the bottom half part 31). When a handle-equipped container such as the present invention is subjected to a compressive load, such as when stacked vertically in a circulation process, stresses will be concentrated on the body part where the bottom end of the handle is in contact, which may deform the container. However, providing the longitudinal rib 14 to this portion can improve the compression strength of the entire container. This is an important embodiment of the present invention. In Embodiment 1 pertaining thereto, a single longitudinal rib 14 having a concave shape is employed; however, the longitudinal rib 14 may be convex, and may comprise a combination of a plurality of ribs.

As shown in FIGS. 7 and 8, the handle 9 comprises a holding part 40 and an attachment part 41, which is attached to the handle-attaching convexity 7 of the container 8. The cross section of the holding part 40 is in the shape of an "H," and an interior plate 43 of the holding part 40 is narrower than the exterior plate 42. Therefore, the H-shaped transverse cross-section of the holding part 40 of the handle 9 allows the weight to be reduced and materials to be conserved. Making the cross-sectional shape of the holding part 40 of the handle 9 into the shape of an "H" allows the weight of the handle to be reduced, and materials to be conserved. Making the plate 43 inside the holding part narrower than the exterior plate 42 can reduce the likelihood of the fingers, when gripping the holding part 40, coming into contact with the interior plate 43, and facilitates holding of the handle. The attachment part 41 has a ring 44 for being fitted into the handle-attaching convexity 7 and a protrusion 45 above the ring 44. The ring 44 and the protrusion 45 prevent the handle from detaching from the concavity 6 of the container 8, and being loosely connected. The reference number 46 in FIG. 4 is a reinforcement rib.

The container 8 and the handle 9 are both made from a polyester material. Examples include a copolyester mainly comprising units of polyethylene terephthalate (PET), polybutylene terephthalate, and ethylene terephthalate. The handle 9 may be made from a material recycled from an article molded from polyethylene terephthalate. Using such a material further increases recyclability.

Next, a description shall be provided of method for manufacturing the handle-equipped container (heat-resistant handle-equipped container) 1 of the above-mentioned configuration.

First, a separate polyester handle 9 is injection-molded. A polyester preform that will become the container 8 is then positioned in a blow-molding mold, and the injection molded polyester separate handle 9 is also positioned in the blow-molding mold. The preform is blow-molded to form a hollow container 8. The blow-molding mold is designed in a configuration wherein a central axis J of the body part 4 below the handle-attaching convexity 7 that is provided to the concavity 6 of the top half part 12 of the body part 4 is inclined 1°±0.5° toward the handle-attaching convexity 7. If the container is heat set in a high-temperature mold, it will contract somewhat on being removed therefrom; however, the insert-molded handle will not contract. Therefore, anomalies will arise in the inclining, filling, and capping steps.

In the present invention, the container 1 is formed in advance in a state that is inclined in the opposite direction, whereby an overall balance will be obtained as a result of contraction when the container is taken out of the mold, and the inclination of the container will be corrected. The wall 32 of the handle-attaching convexity 7 is formed adequately high and sufficient room in the form of the space 11 is formed between the handle 9 and the wall surface 10 that surrounds the handle-attaching convexity 7. As mentioned above, the mold enters the space 11 between the handle 9 and the wall surface 10 that surrounds the handle-attaching convexity 7; therefore, raising the temperature of the mold will enable the wall surface 10 that surrounds the handle-attaching convexity 7 to be heat set and distortion in this portion to be removed in advance.

When the container is blow-molded, and a heat-treatment is performed on at least a part of the blow-molding mold in regions for forming the concavity 6 and the handle-attaching convexity 7 of the container 8; e.g., the top half portion of the mold that comes between the handle 9 and the wall surface 10 that surrounds the handle-attaching convexity 7, then when the blow-molding is performed, the polyester material will flow more readily in the surface-treated regions of the blow-molding mold, but flow less readily below the handle-attaching convexity 7, so as to gather and thicken. Therefore, when the heat-resistant handle-equipped container 1 has been filled with contents and then lifted by the handle 9, greater strength will be provided below the handle-attaching convexity 7, where the applied load will be greatest.

According to patent document 1, a mold comes between a handle and a wall surface surrounding a handle-attaching convexity; less area of contact is obtained between the handle and the container, which are made of the same resin; less friction resistance occurs between the resin and the handle during blow-molding; and the blow-molding ability is improved. However, when the temperature of the mold is increased for purposes of performing heat-setting, such as in the present invention, the resin will tend to adhere to the mold, wherefore it is preferable to subject the surface of the mold to a surface treatment for reducing friction and adhesion with regard to the resin.

There are no specific restrictions on the method for applying the surface treatment to the blow-molding mold, and any well-known method can be employed. Examples include surface roughening treatments such as sandblasting and Iepco treatment, and coating treatments using Teflon® or another fluorine system.

When the container is to be blow-molded, the blow-molding mold reaches a high temperature in order for heat-setting to be performed. When the handle is positioned in the blow-molding mold in order for insert-molding to be performed, a concern arises that the handle will adhere to the mold, deform, whiten, degrade under heat, or be otherwise compromised.

The possibility is especially high for handles that are made from polyester. However, when regions of the blow-molding mold that are likely to contact the handle are subjected to an insulation treatment, such concerns are eliminated, and a molded object can be properly obtained.

The wall surface 10 that surrounds the handle-attaching convexity 7 of the resulting heat-resistant handle-equipped container 1 is heat-set; therefore, even if the container is filled at a high temperature such as mentioned above, wrinkles tend not to form on the wall surface 10, and it will be possible to prevent the handle coming loose and readily detaching. When the heat-resistant handle-equipped container 1 that has been filled with contents, and is then lifted by the handle 9, the greatest load will be applied below the handle-attaching convexity 7. However, this portion is thick, and accordingly has adequate strength, for which reasons anomalies do not occur.

The superiority of the handle-equipped container of the present invention is shown below using a test example and a comparative example.

Test Example

The manufacturing method described above was used to fabricate a two-liter heat-resistant handle-equipped container from a polyester preform that would become the container and the separate injection-molded polyester handle.

The heat-resistant handle-equipped container was subjected to the two tests indicated below.

(1) The heat-resistant handle-equipped container was filled with two liters of water heated to 85° C. The height from which the container could withstand being dropped was measured once the container had cooled to room temperature.

(2) Measurements were taken of the thickness of the side wall of the body part below the handle-attaching convexity.

Comparative Example

A two-liter-capacity heat-resistant handle-equipped container was fabricated in the same manner as in Test Example 1, with the exception that no space was provided between the handle and the wall surface that surrounds the handle-attaching convexity (therefore, the portion of the wall surface that surrounds the handle-attaching convexity to which the handle is connected is not heat set), and a PFA-based release agent was not applied. The heat-resistant handle-equipped container was measured in the same manner as in Test Example 1.

Five containers were used in each example as samples.
The results of the measurements are stated below.

(1) State of Handle Part

The handle of the handle-equipped container of experiment example 1 remained firmly attached even after the container had been filled with hot water. By contrast, when the handle-equipped container of Comparative Example 1 was filled with water, wrinkling occurred on the periphery of the handle-attachment part, while there were also occurrences of wobbliness or separation of the handle.

(2) Thickness of Side Wall of Body Part Below Handle-Attaching Convexity

The heat-resistant handle-equipped container of Test Example 1 had an average thickness of 0.30 mm, and no problems with the outward appearance were encountered in regard to reduced pressure inside the container. However, the handle-equipped container of Comparative Example 1 had an average thickness of 0.25 mm, and the body part below the handle deformed into the shape of a diamond, or the container buckled or exhibited other abnormalities.

(3) Results of Dropping Test

The handle-equipped container of Test Example 1 remained undamaged and exhibited no other anomalies up to a drop height of 1.2 m. However, damage could already be seen on the handle-equipped container of Comparison Example 1 at a drop height of 0.3 m.

Embodiment 1 of the present invention was described hereinabove, but the specific configuration is not provided by way of limitation. It shall be understood that although the transverse cross-sectional shape of the body part of the container is made substantially quadrangular, modifications may be suitably made within a scope that does not depart from the main point of the present invention.

INDUSTRIAL APPLICABILITY

The handle for a container of the present invention and the container to which the handle is attached are exceptional in regard to their storage properties. Their industrial applicability is especially strong in applications that require heat resistance and recyclability. According to the manufacturing method, the container is blow-molded in advance so that the central axis of the body part below the handle-attaching convexity inclines 1°±0.5° toward the handle-attaching convexity. It is accordingly possible to obtain a handle-equipped container in which an overall balance is obtained, the inclination of the container is corrected, and a normal state is preserved.

The invention claimed is:

1. A method for manufacturing a heat-resistant handle-equipped container, comprising insert-molding a separate polyester handle onto a top part of a body part of a hollow container when the container is formed by blow-molding a polyester preform, the method for manufacturing a heat-resistant handle-equipped container comprising the steps of:
   blow-molding with a blow-molding mold positioned so that a central axis of the body part below a handle-attaching convexity provided to a concavity on a top half of the body part is inclined 1°±0.5° toward the handle-attaching convexity; and
   heat-setting a wall surface that surrounds the handle-attaching convexity in the concavity such as to inhibit the formation of wrinkles and to inhibit the polyester handle from coming loose or detaching;
   wherein upon removal the heat-resistant handle-equipped container from said blow-molding mold, the heat-resistant handle-equipped container contracts while the separate polyester handle substantially does not contract such that an angle of inclination of the central axis of the body part below the handle-attaching convexity is corrected to an upright normal state.

2. The method for manufacturing a heat-resistant handle-equipped container according to claim 1, wherein a surface treatment is performed on at least some of the blow-molding mold in a region for molding the concavity of the container and the handle-attaching convexity.

3. The method for manufacturing a heat-resistant handle-equipped container according to claim 1, wherein an insulation treatment is performed on a region of the blow-molding mold that can contact the handle during the insert-molding.

4. The method for manufacturing a heat-resistant handle-equipped container according to claim 2, wherein an insulation treatment is performed on a region of the blow-molding mold that can contact the handle during the insert-molding.

* * * * *